(12) United States Patent
Liu

(10) Patent No.: US 7,215,447 B2
(45) Date of Patent: May 8, 2007

(54) METHOD OF OPTIMAL FOCUSING FOR DOCUMENT SCANNER

(76) Inventor: Rong-Ji Liu, No. 1-1, R&D Rd. Science-based Industrial Park, Hsinchu (TW)

( * ) Notice: Subject to any disclaimer, the term of this patent is extended or adjusted under 35 U.S.C. 154(b) by 706 days.

(21) Appl. No.: 10/237,957

(22) Filed: Sep. 10, 2002

(65) Prior Publication Data

US 2004/0047004 A1    Mar. 11, 2004

(51) Int. Cl.
*H04N 1/04*    (2006.01)

(52) U.S. Cl. ........................ 358/474; 358/475; 358/497; 358/444; 399/211; 399/210

(58) Field of Classification Search ................ 358/475, 358/509, 474, 497, 494, 496, 498, 486, 488, 358/505, 504, 406, 506, 487, 482, 483, 512–514; 382/312, 318, 319; 250/208.1, 234–236, 250/216; 399/211, 210
See application file for complete search history.

(56) References Cited

U.S. PATENT DOCUMENTS

| | | | | |
|---|---|---|---|---|
| 5,157,518 A | * | 10/1992 | Ohtaki et al. | 358/461 |
| 5,446,276 A | * | 8/1995 | Iyoda et al. | 250/208.1 |
| 6,157,468 A | * | 12/2000 | Tsai et al. | 358/488 |
| 6,301,061 B1 | * | 10/2001 | Lin | 359/726 |
| 6,493,075 B1 | * | 12/2002 | Huang et al. | 356/124.5 |
| 6,512,602 B1 | * | 1/2003 | Sheng et al. | 358/498 |
| 6,587,227 B1 | * | 7/2003 | Fullerton | 358/474 |
| 6,603,580 B1 | * | 8/2003 | Taillie | 358/474 |

\* cited by examiner

*Primary Examiner*—Cheukfan Lee
(74) *Attorney, Agent, or Firm*—Berkeley Law & Technology Group, LLP

(57) ABSTRACT

A method of optimal focusing for a document scanner is disclosed. The scanner includes an optical module movable in a given scanning direction to perform scanning operation over an area of a document in a scan line by scan line manner by being driven by an optical module moving mechanism under control of a control unit. The control unit includes a best focus value memory for storage of the best focus value for each scan line. The method includes the steps of moving the optical module to one of the scan lines of the document and retrieving the best focus value corresponding to the selected scan line. A focus adjusting mechanism is controlled by the control unit to move the optical module in a second direction to adjust the focus position of the optical module in accordance with the best focus value of the scan line. Once the optical module reaches the scan line, the operation of the optical module is temporarily suspended in order to have the vibration of the optical module damped out. Thereafter, a scanning operation is performed over the scan line.

8 Claims, 4 Drawing Sheets

METHOD OF OPTIMAL FOCUSING FOR DOCUMENT SCANNER

BACKGROUND OF THE INVENTION

1. Field of the Invention

The present invention relates generally to a document scanner, and in particular to a method of optimal focusing for a document scanner for obtaining best image of scanning.

2. The Related Art

Document scanners have been widely used to digitalize graphic information from reflective and transmissive original documents. A major factor concerning the performance of the document scanners is the resolution, the fineness of the digitalization of a document. Excellent digitalization of documents can be obtained by upgrading resolution of scanner. However, proper focusing is another factor for the excellent digitalization of a document.

FIG. 1 of the attached drawings shows a conventional document scanner, comprising a casing 2 having a scanning window formed by a rectangular opening to which a light-transmitting document support plate 11 is attached for supporting a document 12 to be scanned in a face down manner. An optical module 2 is movably mounted inside the casing 1 below the document support plate 11. The optical module 2 is driven by an optical module moving mechanism 3 under the control of a control unit 4 for movement in a direction, indicated by arrow I, substantially parallel to the document support plate 11 in order to scan throughout the whole area of the document 12.

The optical module 2 comprises a light source 21 for emitting and projecting a light beam toward the document 12 to be scanned. The document 12 reflects the light as indicated by reference numeral 211. The reflected light 211 is redirected by a plurality of reflectors 22, 23, 24, 25 toward a focusing lens 26 and forms an image of the document on an image sensing device 27, such as a charge coupled device (CCD).

Conventionally, the optical module 2 is calibrated to obtain the best focus for properly forming image on the image sensing device 27. However, the optical module 2 may gradually get out of calibration due to aging and environmental factors, such as exposure to shock and vibration.

Automatic focusing techniques are also employed in the document scanners for obtaining clear images. However, such automatic focusing techniques cannot overcome improper focusing caused by vibration of the scanner itself and worn parts.

In addition, conventionally, in a calibrated system, a document to be scanned is supposed to be on the nominal focal plane of the scanner. It is, however, often that the document is partially out of the nominal focal plane when the document is folded or when the document is not properly positioned on the document support plate. This leads to a partially unclear image of the document.

Thus, it is desired to have a method of automatic focusing for a document scanner in order to obtain clear image of the scanned document

SUMMARY OF THE INVENTION

An object of the present invention is to provide a method of optimal focusing for a document scanner that overcomes improper focusing caused by vibration of the scanner itself and worn parts of the scanner.

Another object of the present invention is to provide a method of automatic focusing for a document scanner. The optical module of the document scanner is adjusted by a focus adjusting mechanism under control of a control unit, so that the optical module scans the document at a best focus position.

To achieve the above objects, in accordance with the present invention, there is provided a method of optimal focusing for a scanner wherein the scanner comprises an optical module movable in a given scanning direction to perform scanning operation over an area of a document in a scan line by scan line manner by being driven by an optical module moving mechanism under the control of a control unit. The control unit comprises a best focus value memory for storage of the best focus value for each scan line. The method includes the steps of moving the optical module to one of scan lines of the document and retrieving the best focus value corresponding to the scan line. A focus adjusting mechanism is controlled by the control unit to move the optical module in a direction substantially perpendicular to the scanning direction to adjust the focus position of the optical module in accordance with the best focus value of the scan line. Once the optical module reaches the scan line, the operation of the optical module is temporarily suspended in order to have the vibration of the optical module damped out. Thereafter, a scanning operation is performed over the scan line. If there are more scan lines to be scanned, the optical module is moved to the next scan line for scanning and the process is repeated until all scan lines are done.

BRIEF DESCRIPTION OF THE DRAWINGS

The present invention will be apparent to those skilled in the art by reading the following description of the best mode for carrying out the invention, with reference to the attached drawings, in which.

DETAILED DESCRIPTION OF THE PREFERRED EMBODIMENTS

Figure 1:
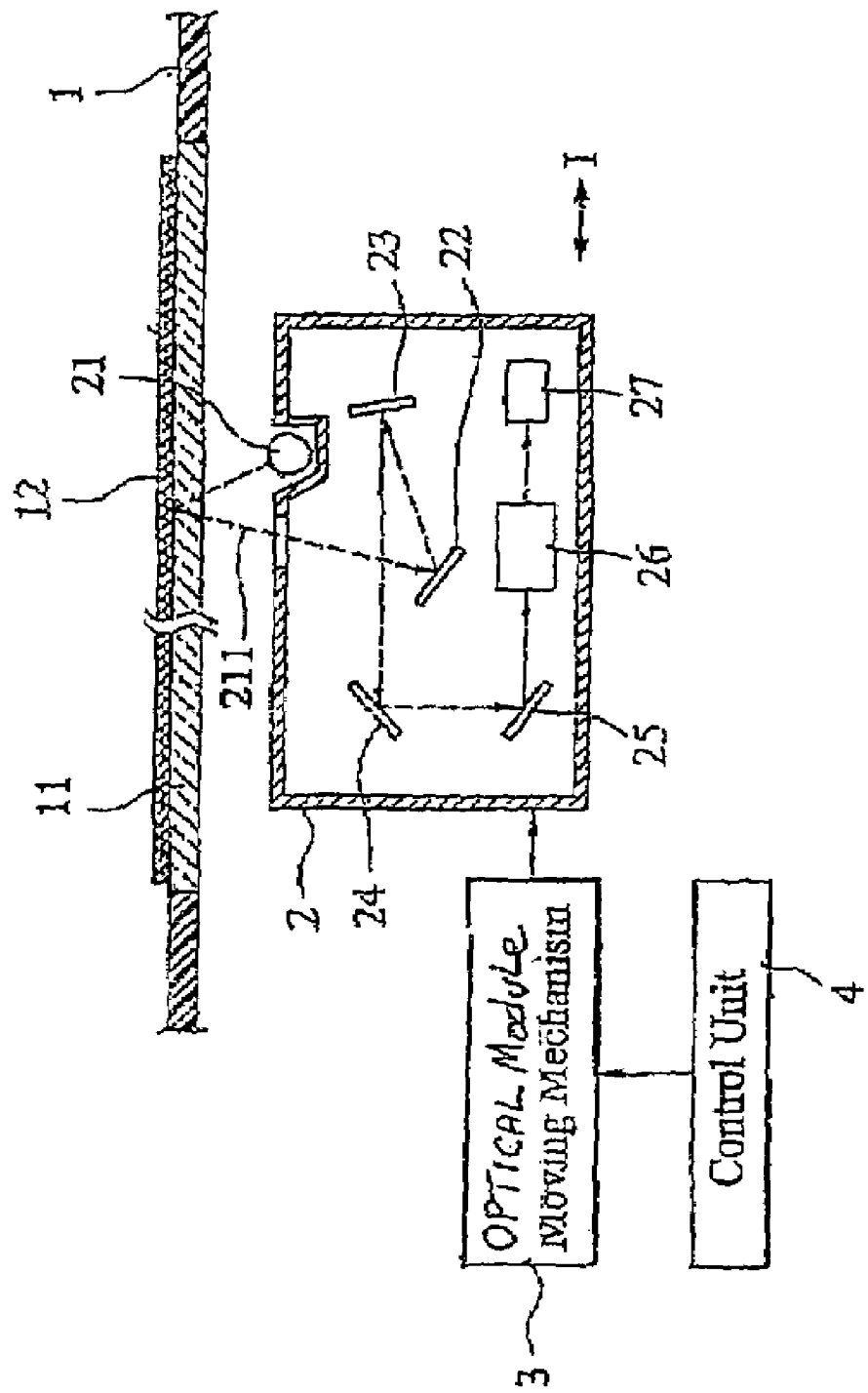
FIG. 1 is a schematic view of a conventional document scanner.
Figure 2:
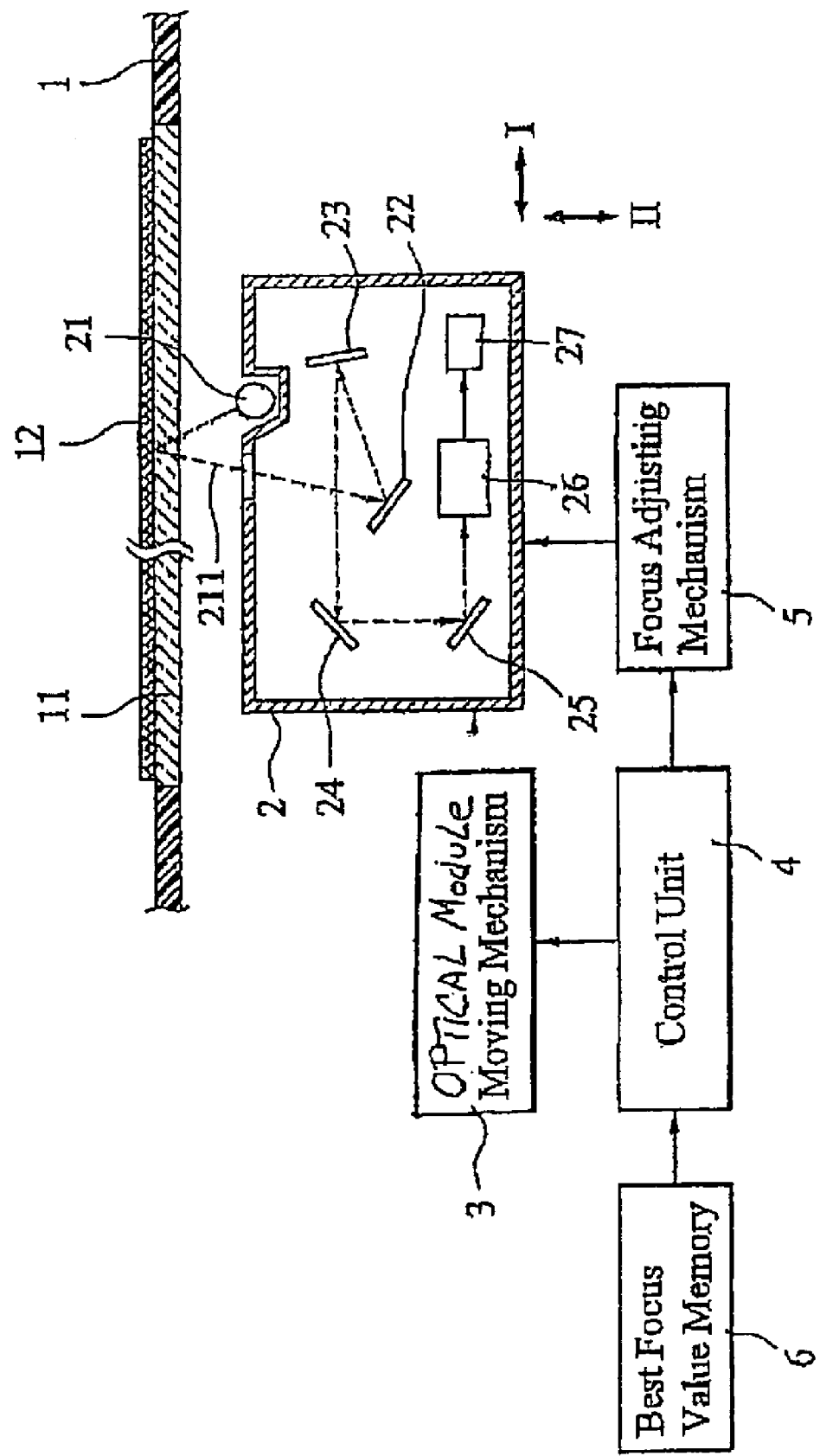
FIG. 2 is a schematic view of a document scanner constructed in accordance with the present invention.

With reference to the drawings and in particular to FIG. 2, a document scanner constructed in accordance with the present invention comprises a casing 1 having a light-transmitting document support plate 11 on which a document 12 to be scanned is positioned in a face down manner. A movable optical module 2 is arranged inside the casing 1 and below the document support plate 11. The optical module 2 comprises a light source 21 projecting a light beam toward the document 12. The document 12 reflects the light beam as a reflected light indicated by reference numeral 211 traveling into the optical module 2. The reflected light 211 is redirected by a plurality of reflective mirrors 22, 23, 24, and 25 arranged in the optical module 2 toward a focusing lens 26 for forming an image on an image detector or an image sensing device 27, such as a Charge Coupled Device (CCD).

The optical module 2 is driven by an optical module moving mechanism 3 under the control of a control unit 4 to move, in a first scanning direction indicated by arrow I that is substantially parallel to the document support plate 11 of the scanner, with respect to the document 12 in a step by step manner in order to scan an area of the document 12 in a scan line by scan line manner.

In accordance with the present invention, the scanner further comprises a focus adjusting mechanism 5 which operates under the control of the control unit 4 to move the optical module 2 (or alternatively the focusing lens 26 and the image sensing device 27) with respect to the document support plate 11 in a second direction, indicated by arrow II that is substantially perpendicular to the document support plate 11, for adjustment of the focus position of the optical module 2.

The control unit 4 comprises a best focus value memory 6 for storage of at least one set of best focus value of each scan line or that of scan lines of every given number. This will be further discussed.

Figure 3:
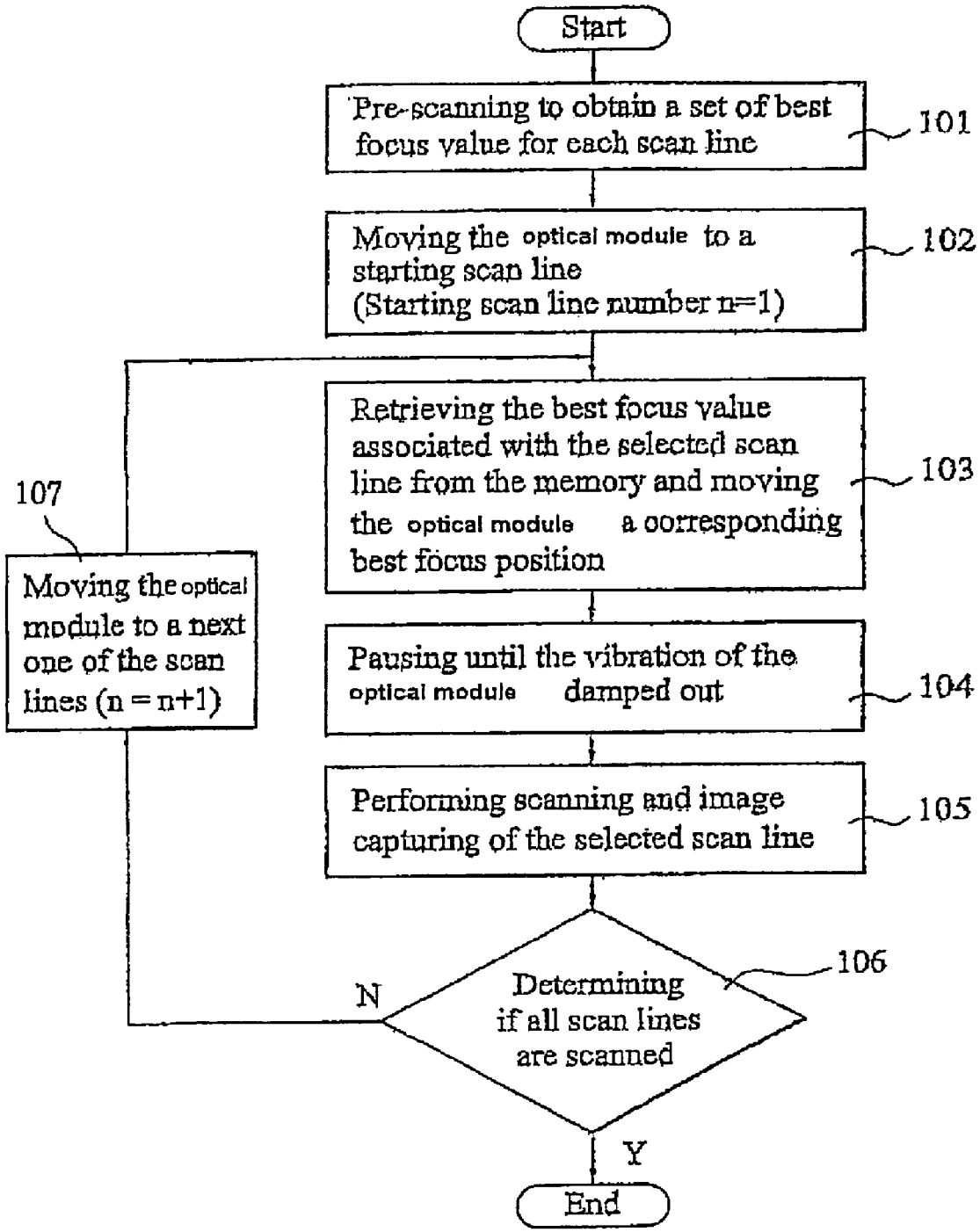
FIG. 3 is a flow chart of a method of automatic focusing for the document scanner of the present invention.

FIG. 3 shows a flow chart of a method of automatic focusing in accordance with the present invention. A pre-scanning (step 101) is taken first before a document is actually scanned. The pre-scanning process allows the scanner to obtain the best focus value of each scan line and such best focus value is stored in the best focus value memory 6. An illustrative way of performing the pre-scanning is done by means of a test sheet (not shown) generally comprised of alternating black and white patterns or segments. Thus the best focus value of each scan line with respect to the test sheet is obtained and stored in the best focus value memory 6.

Figure 4:
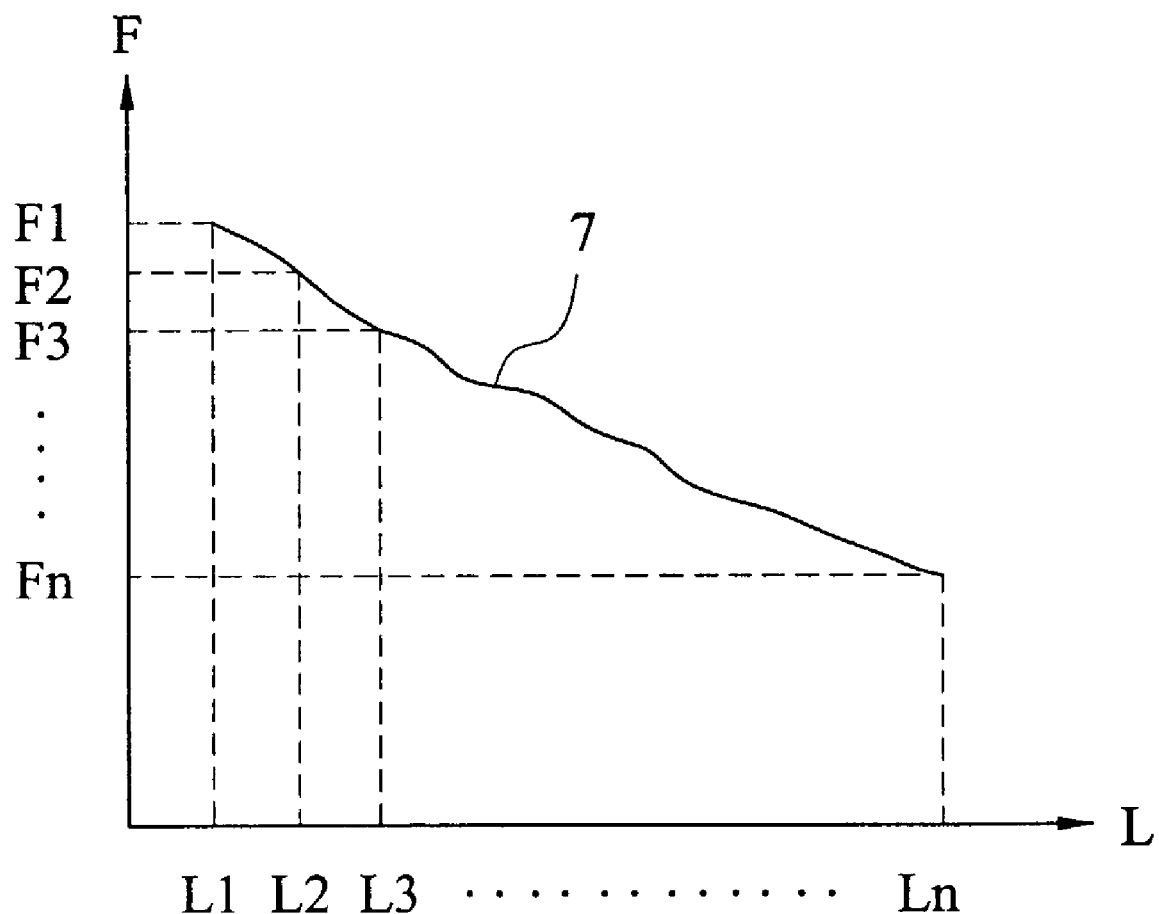
FIG. 4 is a plot showing the relationship between best focus value and scan line in accordance with the present invention.

FIG. 4 is a plot showing the relationship between best focus value and scan line obtained in step 101 of the present invention, wherein the abscissa represents the scan line number (L1, L2, L3, . . . , Ln) and the ordinate is the best focus value (F1, F2, F3, . . . , Fn) associated with the scan lines (L1, L2, L3, . . . , Ln). A best focus curve 7 can thus be obtained by connecting the points of the best focus value with respect to the scan lines. The curve 7 is stored in the best focus value memory 6 to be accessed by the control unit 4. There may be more than one set of best focus data stored in the best focus value memory 6.

In scanning a document 12 that is positioned on the document support plate 11, the optical module moving mechanism 3 drives the optical module 2 in the first direction I to a desired one of the scan lines, such as the starting scan line of the document 12 (step 102). In this case, the count number n of scan line Ln is set to 1, i.e. the starting scan line L1. In step 103, the control unit 4 retrieves the best focus value associated with the scan line to be scanned from the best focus value memory 6 and actuates the focus adjusting mechanism 5 to move the optical module 2 in the second direction II to a best focus position in accordance with the best focus value.

The movement of the optical module 2 to the scan line may cause the optical module 2 to vibrate. The optical module moving mechanism 3 thus pauses for a while until the vibration of the optical module 2 is damped out (step 104). In step 104, the operation of the optical module 2 is temporarily suspended for a predetermined time period t until the vibration thereof is damped out. The time period t can be determined in accordance with the design of the scanner or an experimental measurement of the time required for the vibration to be damped down to a predetermined level. The optical module 2 then performs scanning and image capturing of the selected scan line (step 105).

After the scanning of the starting scan line is done, the scanner determines if all scan lines are scanned (step 106) and if there is any scan line that is not scanned, then the optical module 2 is moved to a next one of the scan lines t and the count number n is increased by 1, namely n is set to n+1 (step 107). In this case, n is equal to two and the optical module 2 is moved to the second scan line L2 and the steps 103 to 106 are repeated. The steps 102 to 106 are repeatedly continued until the scanner determines that all scan lines are done.

In the example given above, the counter n is increased by one. It is apparent to those having ordinary skills to increment n by two or any integral number. This may shorten the overall scanning time but gives a poorer resolution.

The focus adjusting process of the present invention features a temporary suspension of the optical module 2 until the vibration of the optical module 2 is damped out. This eliminates poor imaging caused by the vibration of the optical module 2 induced by the movement thereof. The process of the present invention also features adjustment of the focus position of the optical module 2 by moving the optical module 2 in a direction substantially normal to the scanning direction of the optical module 2. This allows for precise focusing of the optical module 2 with respect to the image sensing device 27. Enhanced imaging quality can be obtained.

Although the present invention has been described with reference to the best mode of operation thereof, it is apparent to those skilled in the art that a variety of modifications and changes may be made without departing from the scope of the present invention which is intended to be defined by the appended claims.

What is claimed is:

1. A method of optimal focusing for a document scanner, wherein the scanner comprises an optical module movable to perform a scanning operation over an area of a document under control of a control unit, the method comprising the steps of:
   (a) moving the optical module in a first direction substantially parallel to the document to a starting scan line of the document;
   (b) moving the optical module in a second direction substantially perpendicular to the document for adjusting a focus position of the optical module with respect to the document in accordance with a best focus value corresponding to the selected scan line;
   (c) temporarily suspending the optical module for a predetermined time period until a vibration of the optical module is damped out;
   (d) scanning the selected scan line of the document; and
   (e) moving the optical module to a next one of the scan lines of the document in the first direction and repeating steps (b) to (d) until all scan lines are done.

2. The method as claimed in claim 1 further comprising the step of performing a pre-scanning operation before the step (a) for establishing the best focus value for each scan line.

3. The method as claimed in claim 2, wherein the pre-scanning operation is done by scanning a test sheet comprised of alternating black and white segments in order to obtain the best focus value for each scan line.

4. The method as claimed in claim 2, wherein the best focus value is stored in a best focus value memory of the document scanner to be accessed by the control unit.

5. The method as claimed in claim 4, wherein the best focus value memory stores at least one set of the best focus value.

6. A method of optimal focusing for a document scanner, wherein the scanner comprises an optical module movable to perform a scanning operation over an area of a document under control of a control unit, the control unit comprising a best focus value memory storing a best focus value corresponding to each scan line, the method comprising the steps of:
- (a) moving the optical module in a first direction substantially parallel to the document to a starting scan line of the document;
- (b) retrieving the best focus value corresponding to the scan line from the best focus value memory;
- (c) moving the optical module in a second direction substantially perpendicular to the document for adjusting a focus position of the optical module with respect to the document in accordance with a best focus value corresponding to the selected scan line;
- (d) temporarily suspending the optical module for a predetermined time period until a vibration of the optical module is damped out;
- (e) scanning the selected scan line of the document; and
- (f) moving the optical module to a next one of the scan lines of the document in the first direction and repeating steps (b) to (d) until all scan lines are done.

7. The method as claimed in claim 6 further comprising the step of scanning a test sheet comprised of alternating black and white segments in order to obtain the best focus value for each scan line.

8. The method as claimed in claim 6, wherein the best focus value memory stores at least one set of the best focus value.

* * * * *